May 5, 1925.

P. C. HEWITT 1,536,851

INTERNAL COMBUSTION ENGINE

Filed July 22, 1919

May 5, 1925. 1,536,851
P. C. HEWITT
INTERNAL COMBUSTION ENGINE
Filed July 22, 1919  6 Sheets-Sheet 4
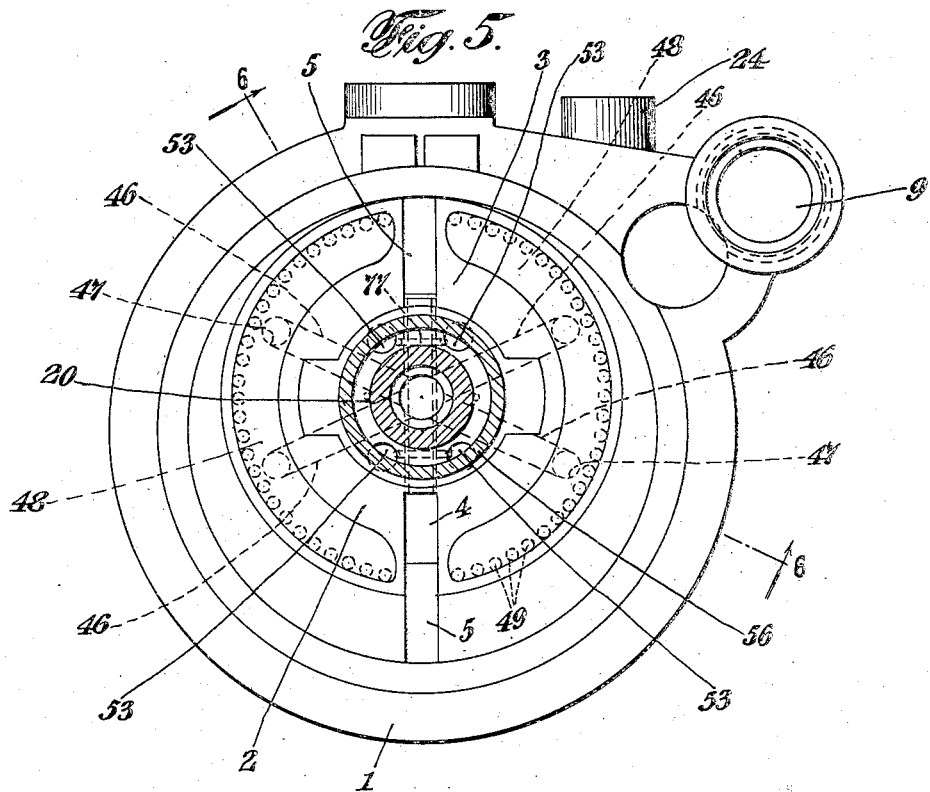
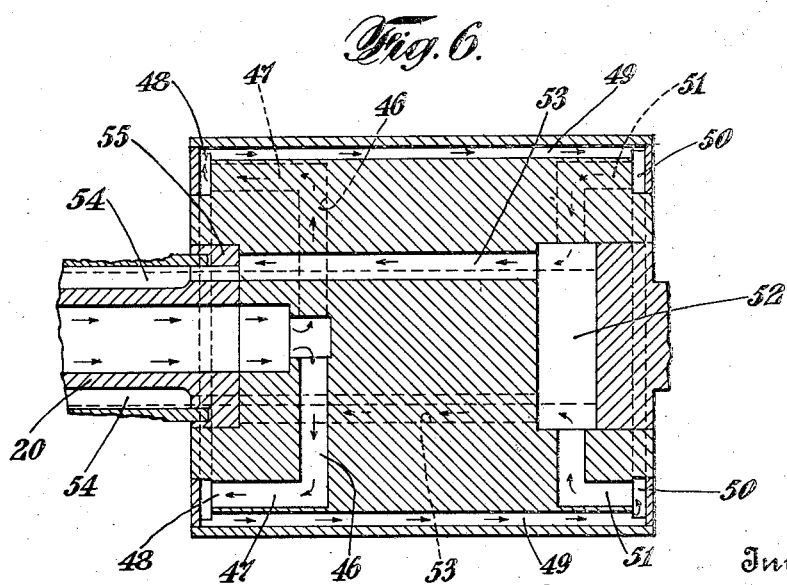
Inventor
Peter Cooper Hewitt,
By his Attorneys
Kenyon & Kenyon

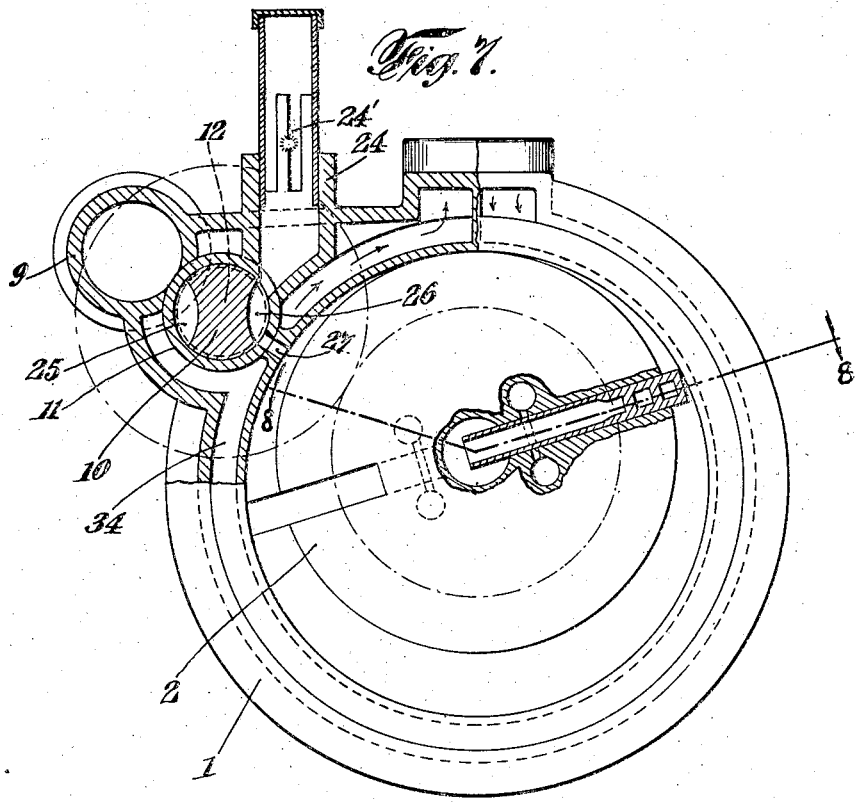
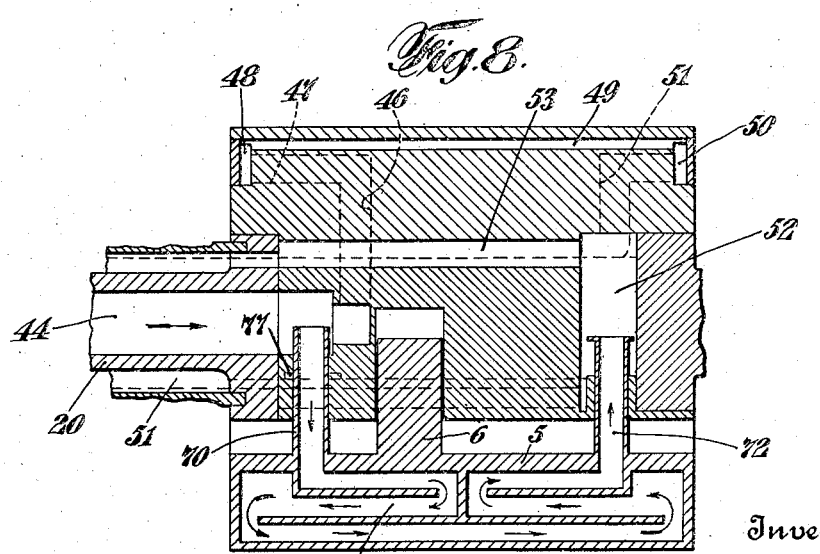

May 5, 1925.
P. C. HEWITT
1,536,851
INTERNAL COMBUSTION ENGINE
Filed July 22, 1919    6 Sheets-Sheet 6
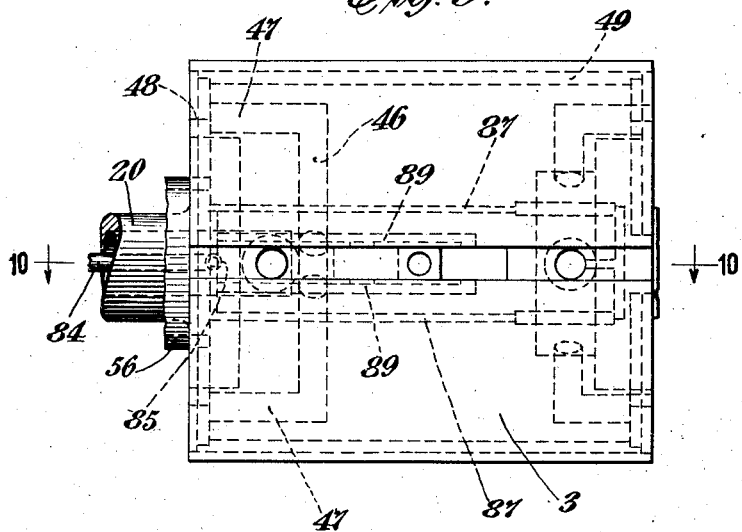
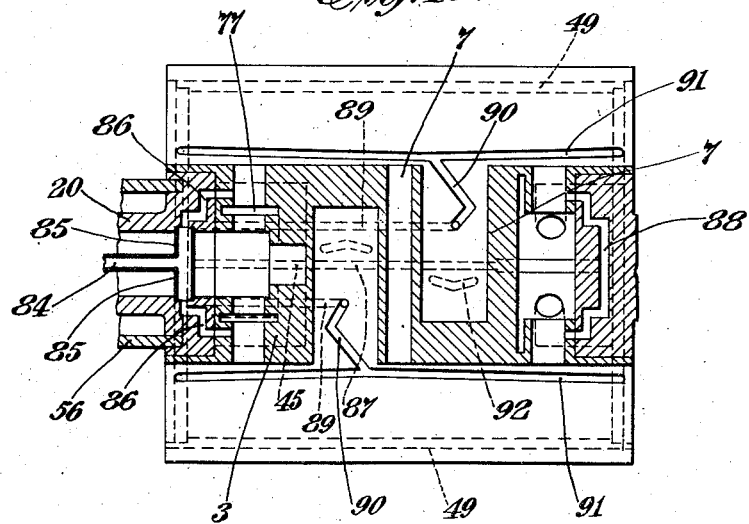

Patented May 5, 1925.

1,536,851

UNITED STATES PATENT OFFICE.

PETER COOPER HEWITT, OF RINGWOOD MANOR, NEW JERSEY; THE FARMERS' LOAN AND TRUST COMPANY EXECUTOR OF SAID PETER COOPER HEWITT, DECEASED.

INTERNAL-COMBUSTION ENGINE.

Application filed July 22, 1919. Serial No. 312,538.

*To all whom it may concern:*

Be it known that I, PETER COOPER HEWITT, a citizen of the United States, and a resident of Ringwood Manor, Passaic County, and State of New Jersey, have invented certain new and useful Improvements in Internal-Combustion Engines, of which the following is a specification.

My invention relates to engines or motors and more particularly to engines of the internal combustion type. One of the objects of the invention is to provide an efficient engine of this type, which is light in weight and may be operated at very high speeds. In accordance with this object, I have provided an engine or motor in which the power produced by the explosion or combustion of the fuel is applied directly to produce rotation of the engine shaft and the parts carried thereby, the motor or engine availing of the expansive force of the products of combustion with a minimum inertia due to reciprocation.

My invention contemplates the provision of means whereby every part of the internal surface of the engine of not only the engine casing but also the rotor or rotatable member of the engine and all its parts may be effectively cooled and also the provision of means whereby the engine may be effectively lubricated or oiled.

Another object of my invention is to provide improved ignition means for the engine.

Other objects, features and advantages of the invention will appear more fully in the following detailed description and in the appended claims.

The accompanying drawings forming a part of this specification illustrate one embodiment of the invention.

In the drawings—

Fig. 5 is a view taken on line 5—5 of Fig. 2, the inlet valve of the casing being omitted.

Fig. 6 is a section of the rotor of the engine taken on line 6—6 of Fig. 5, the lubricating means being omitted.

Fig. 7 is a view of the said embodiment of the invention taken partly with one head of the engine casing removed and partly in section on line 7—7 of Fig. 1, part of the rotor being broken away.

Fig. 8 is a section of a rotor taken on line 8—8 of Fig. 7, the lubricating means being omitted.

Fig. 9 is a plan view of the rotor, but without its movable wings; and

Fig. 10 is a section taken on line 10—10 of Fig. 9.

Figure 1:
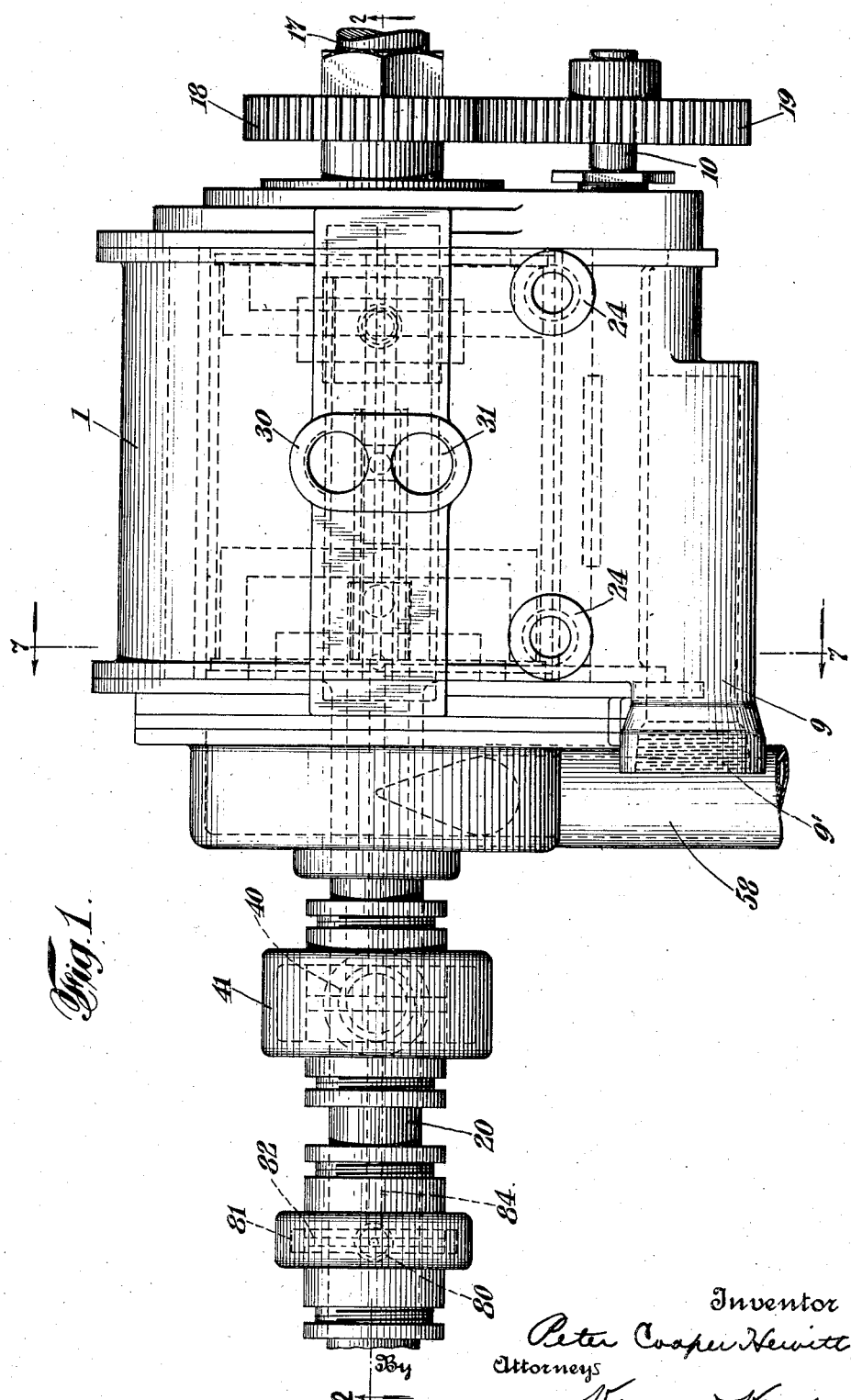
Fig. 1 is a plan view of said embodiment of the invention.

The motor comprises a casing 1 which, as shown, is substantially in the form of a cylinder with a horizontal axis and within which is arranged a rotor 2. The rotor, as shown, is mounted within the bore or power chamber of the casing for rotation about a horizontal axis located eccentrically or to one side of the axis of the casing. The rotor comprises a body portion 3, which is substantially in the form of a horizontal cylinder with an external diameter less than the cylindrical bore of the casing 1. Preferably the body portion 3 of the rotor is made of such diameter that it remains in contact with the bore of the casing at one point, as shown in Figs. 5 and 7.

The body of the rotor is provided with radial slots or grooves 4 extending throughout the length of the rotor and within each of which slots or grooves a wing 5 is mounted for sliding movement radially of the rotor. These wings, during the rotation of the rotor are held in engagement with the bore of the casing 1 by centrifugal force, and also by the pressure of a spring 96 which, as shown, is mounted in a tube 97 having plungers 98 telescopically mounted in the ends thereof and bearing against the wings. The spring bears against the inner ends of the plungers; and the tube 97 is slidably mounted in a radial passage extending through the body of the rotor so as to be adapted to change its position in accordance with the movement of the wings.

Figure 2:
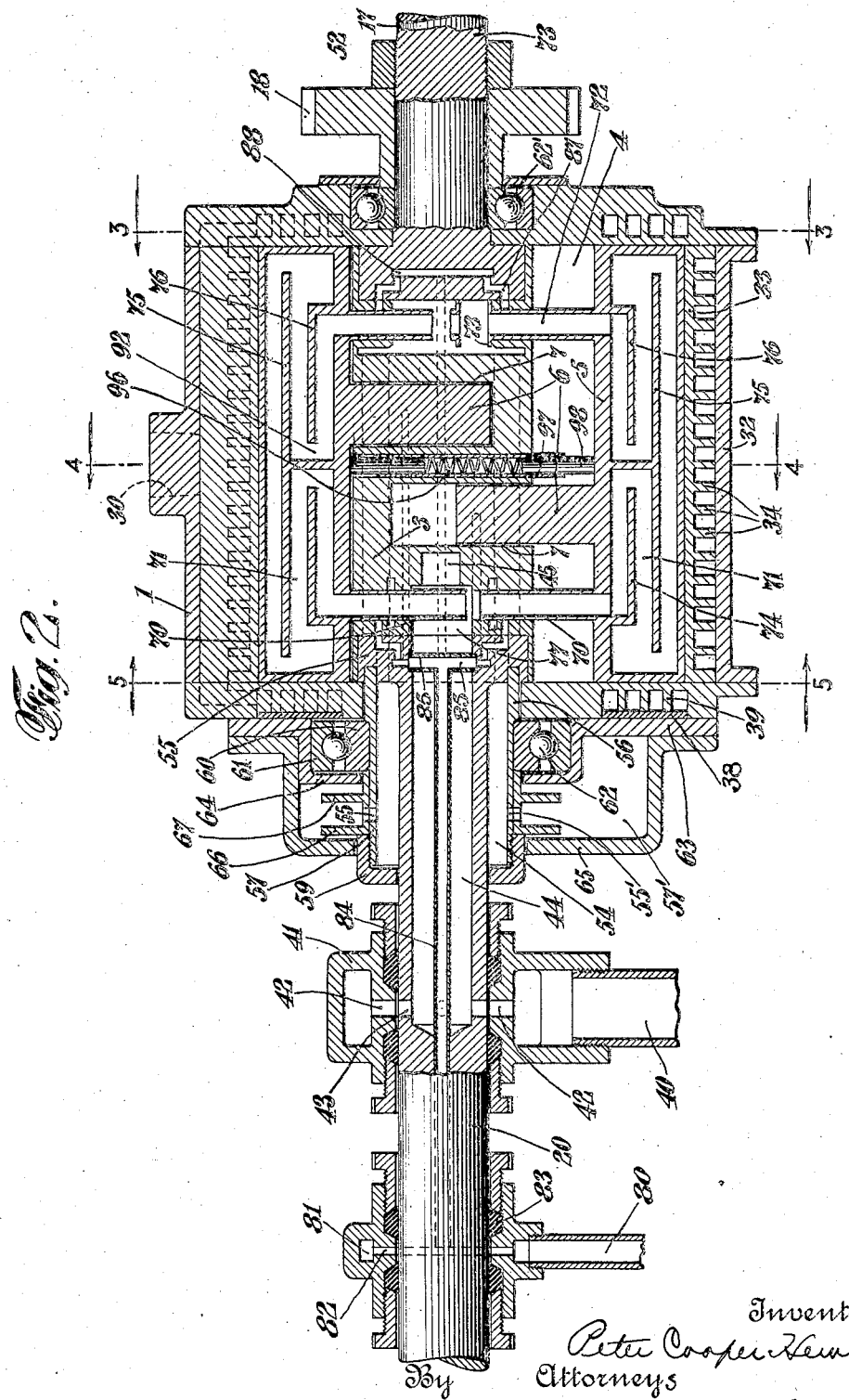
Fig. 2 is a longitudinal section thereof taken on line 2—2 of Fig. 1.

As clearly shown in Figs. 2 and 8, each wing comprises a flat elongated body or outer portion on the inner side of which there is a projection 6 which fits loosely for sliding movement within a radial recess or pocket 7 in the body 3 of the rotor.

Referring to Fig. 2, the body and the wings of the rotor are of the same length as the inner bore of the casing 1 so that there are formed within the casing a number of compartments depending upon the number of wings, each compartment being bounded by an adjacent pair of wings, a portion of the body of the rotor and a portion of the outer casing. As shown, two wings are employed and the device contains two such compartments. As shown, these compartments increase in cross-section downwardly from the top of the motor casing.

For admitting the fuel, which may be the usual mixture of gasolene vapor and air, within the desired compartment in the power chamber of the casing at the proper time, the device, as shown, is provided with a hollow portion 9 providing an inlet chamber (see Figs. 1, 4, 5 and 7) extending along the casing 1 near the upper end and to one side thereof. This fuel inlet 9 is provided with a threaded connection 9' whereby it may be connected with a suitable source of fuel. Between the fuel inlet 9 and the interior of the casing 1 is arranged a valve 10, this valve, as shown, being an elongated cylindrical member rotatable about its longitudinal axis and being mounted for rotation in a seat 11. The latter may be in the nature of a cylindrical bushing secured in any suitable manner between the fuel inlet and the inner wall of the casing 1. The valve 10 is provided with a passage 12 extending diametrically through the same for a considerable distance longitudinally of the casing 1 and the valve seat 11 is provided with a port 14 whereby the passage 12 in the valve may be placed in communication with the interior of the fuel inlet 9, the valve seat being also provided with an opening 15 whereby at the same time the opening 12 may be placed in communication with the interior of the casing 1 through an opening 16 formed in the inner wall of the said casing. The valve 10 is rotated from the shaft 17 of the rotor at the same angular velocity as the rotor so that in the form of the invention shown, fuel will be admitted into the engine cylinder through the valve opening 12 twice for each revolution of the motor. In other words, there will be an admission of fuel for each compartment formed between the rotor, its wings and the casing 1.

Referring to Fig. 1, the valve 10 is rotated from the rotor shaft by means of a gear 18 secured to the said shaft and gear 19 of the same size meshing therewith and secured to the valve 10. The fuel is supplied under a pressure which may be between sixty and one hundred pounds or more per square inch. A very suitable pressure would be between eighty and ninety-five pounds per square inch. The use of such pressure in supplying the fuel renders unnecessary any compression of the fuel within the engine. The width of the slot or opening 12 in the valve (referring to Fig. 4) is made such as to cause just the proper amount of fuel to be admitted to the motor for each explosion or combustion of the fuel. In a motor of the type herein described designed by me, the valve 10 shuts off the admission of fuel to the interior of the casing 1 after the adjacent wing is moved beyond the inlet portion 16 a distance such that the volume of the compartment to which the fuel is admitted from the port is about one-fifth of the maximum volume of the said compartment. By reason of the cooling effect resulting from the vaporization of gasolene and other such fuel, no special cooling means are necessary for the compressor for compressing the fuel prior to its admission to the motor, but in case the fuel used should require it, such cooling means may be employed.

After the admission of the fuel and the closing of the fuel inlet valve, the fuel is ignited by suitable means which will be hereinafter more fully described, whereupon by reason of the gaseous expansion resulting from the explosion or combustion of the fuel, the compartment containing the fuel tends to enlarge, thereby driving the forward wing downwardly and causing the rotation of the rotor and the engine shaft 20, which is rotatable therewith. The products of combustion or explosion are permitted to escape after suitable expansion through the outlet or exhaust port, which is desirably located in an end wall of the casing 1 as shown at 21 in Fig. 3. This port may be and desirably is freely open to the atmosphere no valve being necessary at this point. If desired, the motor casing may be provided with a suitable means for connection 22 for leading off the products of combustion to a muffler or wherever desired.

While I may employ for ignition the ordinary intermittent sparking means employed with internal combustion engines, I have shown in the form of the invention illustrated in the drawings a construction whereby a continuously incandescent means such as a small electric arc lamp or an incandescent filament, of platinum for example, may be employed for causing the ignition of the fuel at the proper time. Such an ignition device is free from many of the defects in the usual devices now employed for producing intermittent sparks, such for example, as the tendency of the contact points of the ordinary magneto to get out of order.

Referring to Figs. 1 and 7, the motor casing comprises hollow connections 24 the interior of which may be connected with the space surrounding a continuously incandescent device of the character described, such as the electric arc 24'. The hollow connections 24 lead to the valve member 10 referred to above, the member 10 having passages 25 and 26 on opposite sides which are each adapted to register through openings or ports in the valve seat 11 with the interior of each connection 24 and the interior of the casing 1, the latter being provided with ports or openings 27 communicating with ports or openings in the valve seat 11. During the rotation of the valve member 10 by the rotor of the motor, each of the passages or recesses 25, 26, establishes a communication between the interior of the motor casing and the interior of the corresponding connection 24 for a sufficient length of time to enable the propagation of the ignition from the ignited element of the ignition apparatus through the fuel into one of the compartments within the motor or engine. Referring to Fig. 7, it will be seen that the flow of fuel to such compartment through the opening 12 in the valve is shut off by the valve member 10 before the ignition takes place and danger of igniting the fuel in the fuel supplying means is thereby obviated. The ignition means is shown in Fig. 7 for one end of the motor; the ignition means for the other end being the same in construction although a different type of ignition may be used at one end from the other. With the construction shown employing two passages 25, 26 for each of the connections 24, there will be two explosions corresponding to the double supply of fuel for each rotation of the rotor. It is to be understood, however, that the motor may be designed for only one or a greater number of explosions for each rotation of the rotor.

My invention contemplates, as stated, provision of means whereby the motor may be very effectively cooled. I have provided a construction whereby a suitable cooling medium or fluid, such as water, may be passed not only through the motor casing 1, but also through the body and wings of the rotor, whereby all of the surface of the explosion and expansion chamber is cooled.

Figure 4:
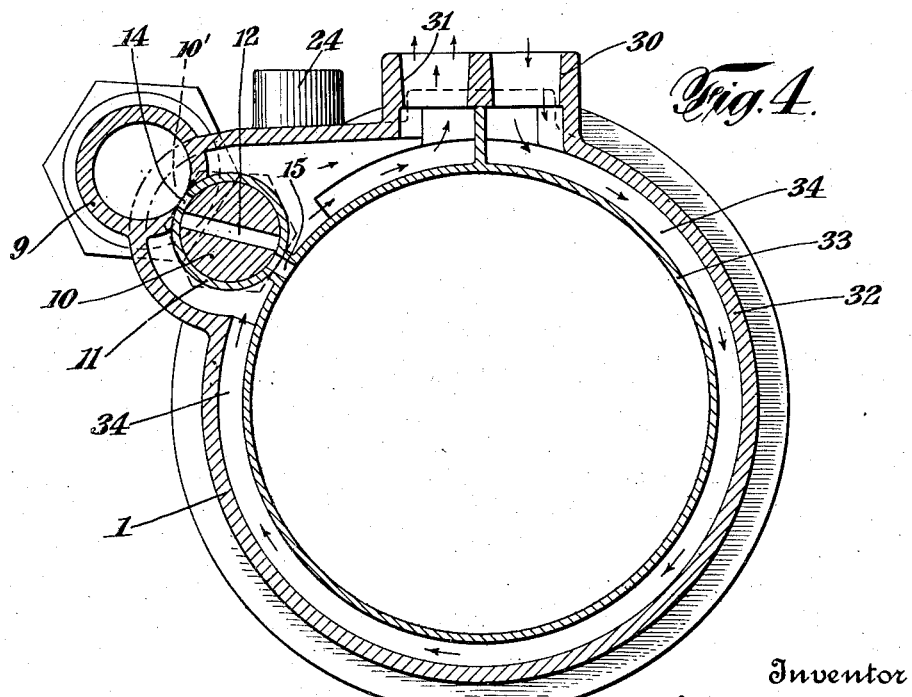
Fig. 4 is a section of the engine casing taken on line 4—4 of Fig. 2.

The water for cooling the body of the casing 1 is supplied, as shown in Fig. 4, to a connection 30 which may be connected to any suitable source of supply, preferably a power supply actuated by the motor, and is then circulated around the body of the casing and discharged through the connection 31. To this end the casing 1 is formed with an outer wall 32 and a wall 33 spaced inwardly of the wall 32. The wall 33 is preferably made quite thin, desirably considerably thinner than wall 32, so that the engine may be very effectively cooled by the cooling fluid. In order to facilitate the abstraction of the heat from the casing by the cooling fluid, the wall 33 is desirably provided with a considerable number of annular flanges 34 arranged parallel to each other at right angles to the axis of the casing and spaced a short distance apart, as clearly shown in Fig. 2. These flanges throughout the major portion of their length extend from the wall 33 outwardly into contact with the inner surface of the wall 32 so as to form a number of parallel co-axial passages extending circumferentially around the body of the casing 1. By this construction the body of the casing presents a very large surface with which the cooling fluid comes into contact so that the heat is very effectively removed by the cooling fluid. These flanges also serve to give strength to the wall which should preferably be thin. Referring to Fig. 4, the valve seat 11 and the casing are formed to prevent the passage of the cooling fluid into the fuel inlet 9. Also the valve seat 11 has a fluid tight connection with the inner wall 33 of the casing 1 around the fuel inlet port 16. Referring to Fig. 7 the cooling fluid is prevented by a like construction from passing into the ignition connection 24. The cooling fluid circulates or passes from the lower to the upper side of the valve member through the passage 10′ extending around the valve seat at a point outwardly beyond the inner or back end of the fuel inlet 9 and also through passages between the wall 33 of the lower casing, and the valve seat 11 intermediate the valve ports 16 and 27, and outwardly beyond the ports 27. The flanges 34 on the body of the casing 1 may also be cut away adjacent the valve seat so as to permit the cooling fluid to flow longitudinally of the casing into the heads thereof and back above the valve seat. The arrangement is such that the cooling fluid abstracts heat from the valve and its seat and maintains the same cool.

Figure 3:
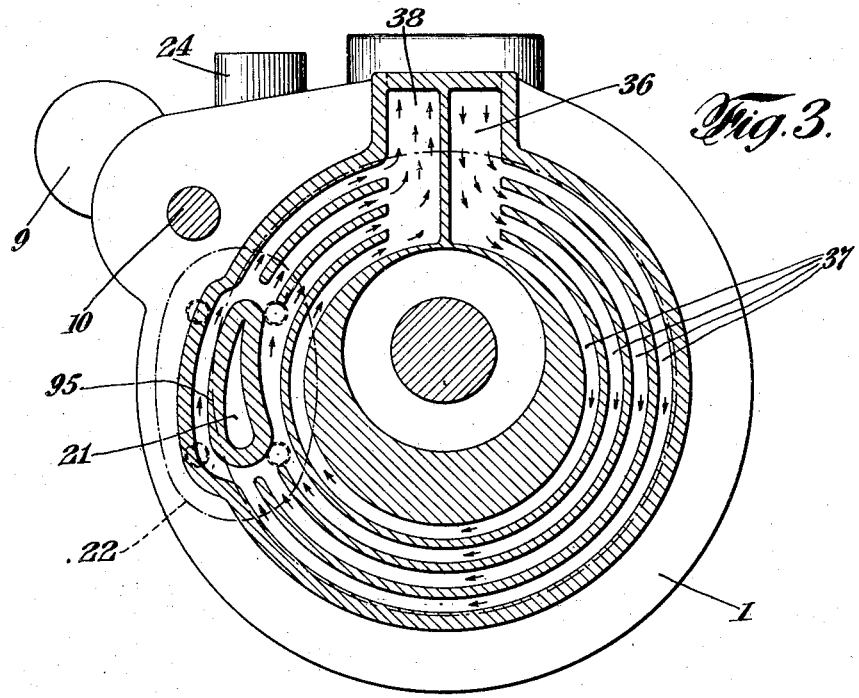
Fig. 3 is a view partly in elevation and partly in section taken on line 3—3 of Fig. 2.

The casing 1, as shown, is provided with two heads (see Fig. 2) through each of which the cooling medium passes. Referring to Figs. 2 and 3, the cooling medium for the right hand head of the casing passed downwardly from the supply channel 36 which extends from the inlet connection 30 lengthwise of the casing, and then downwardly and through parallel passages 37 which extend around the head of the casing concentrically with the same. It then passes upwardly into the channel 38 extending longitudinally of the casing adjacent the channel 36, the cooling medium from both heads being discharged through the outlet connection 31 with the cooling medium from the body of the casing. In Fig. 3 the walls intervening between the various passages 37 terminate a slight distance from the wall surrounding the outlet port 21 for the products of combustion, the entire body of cooling fluid in the heads circulating around the wall for the outlet port 21. The cooling fluid is circulated through the head of the casing 1 shown to the left in Fig. 2 in the same way as described above except that there is no interruption of the walls between the passages 37, such as that shown in Fig. 3 to provide for the outlet port 21. In the left hand head of the casing, referring to Fig. 2, the outer wall of the passages for the cooling fluid is an annular plate 38 secured in position so as to bear upon the tops of the flanges 39 constituting the walls between the passages 37.

I shall now describe the means whereby the cooling fluid may be passed through the rotor. Referring to Fig. 2 the cooling fluid, such as water, is supplied through an inlet pipe 40, under a suitable pressure sufficient to force the water through the rotor. The inlet pipe 40 communicates with an annular conduit 41 surrounding the shaft 20, and provided with a series of radial outlets 42 which communicate successively during the rotation of the shaft 20, with radial passages 43 in said shaft. Passages 43 lead to a longitudinal axial passage 44 in the shaft 20, this passage being closed at one end and extending at the other end into the body of the rotor, being provided at its inner end, as shown, with a portion 45 of reduced diameter.

To permit the flow of the cooling fluid through the body of the rotor, passages 46 (see Figs. 5, 6, 8 and 9) extend radially outwardly from the portion 45 of the passage 44, the outer portions of the passages 46 extending longitudinally towards the adjacent end of the rotor as shown at 47, and communicating at their outer ends with arc-shaped chambers 48. As shown in Fig. 5, there are two of these chambers 48, each of which has communicating therewith two of the passages 46, 47. From the outer portions of each of the chambers 48 extend a plurality of passages 49. Referring to Fig. 5, there are a considerable number of the passages 49 extending from each of the chambers 48, these passages being arranged close to the outer peripheral portion of the body of the rotor around substantially the entire periphery of the latter and extending approximately from one end to the other end of the rotor. These passages accordingly very effectively distribute the cooling medium for carrying off the heat imparted to the rotor by the explosion of the fuel. At their outer ends the passages 49 communicate with chambers 50 of the same shape as the chambers 48 and arranged in a similar manner at the opposite end of the rotor. From the chambers 50, the cooling fluid flows through passages 51 to a chamber 52 which, as shown, is cylindrical in shape and arranged axially of the body of the rotor. The passages 51, as shown, extend first inwardly longitudinally of the rotor and then axially inwardly towards the chamber 52.

There may be the same number of passages 51 as passages 46, 47, the axes of the passages 51 being arranged in the same radial planes as the axes of the respective passages 46, 47. From the chamber 52 the cooling fluid flows through passages 53 extending longitudinally of the rotor from the outer peripheral portion of the chamber 52. The outer ends of the passages 52 communicate with an annular chamber 54 surrounding the shaft 20 (see Figs. 2, 6 and 8). In order to prevent all of the cooling fluid from flowing out of the rotor from the passages 53 into the chamber 54, I have provided the body of the rotor with a member 55 which has portions extending inwardly towards the axis of the rotor across the outlet ends of the passages 53 so as to form dams or weirs, as shown in Fig. 6.

From the chamber 54 the cooling fluid passes through openings 55' in the annular outer wall 56 of the chamber and in the flanged member 57 surrounding the wall 56, the fluid passing into an outlet chamber 57' from which it is conducted, as by the outlet pipe 58, (see Fig. 1). The annular wall 56 is, as shown, secured at one end to the adjacent end of the rotor and it is provided at its other end with the flange 59 which fits down closely around the shaft 20.

For maintaining the rotor in proper relation to the motor casing 1, I have shown a ball bearing which comprises an inner race 60, mounted upon the annular wall 56, and an outer race 61 and a plurality of balls or anti-friction members 62, between the two races. The ball bearing is held in position with respect to the motor casing 1, by means of a bracket 63 which is secured to the one end wall of the casing 1 and is provided with a flange 64 extending inwardly so as to cover the outer end of the ball bearing, the periphery of the outer ball race being seated within the bracket 63. The other end of the rotor may be held in proper relation to the casing by a ball bearing, as shown at 62'.

The outer wall 65 of the chamber 57, is as shown, secured to the motor casing 1 over the bracket 63, this wall extending inwardly close to the member 59. The flanged member 57, which is arranged within the chamber 57', is formed with a cylindrical portion engaging the wall 56 and with parallel annular flanges 66 and 67 arranged on opposite sides respectively of the openings 55 desirably at right angles to the axis of the rotor. The flanges 66 and 67 direct the cooling fluid into the lower portion of the chamber 57 from which the outlet 58 extends while keeping the water out of contact with the various joints at the inner portion of the chamber 57' around the shaft 20, thereby preventing leakage of the fluid at said point.

I have also provided means whereby the cooling fluid may be passed through the wings of the rotor and shall now describe these means. Referring to Figs. 2 and 8, each wing is provided adjacent one end with an inwardly extending tubular portion or member 70, which passes slidingly or telescopically through an opening in the body of the rotor during the inward or outward movement of the wing with respect to the body of the rotor, the tubular portion 70 fitting within said opening. The latter opening communicates with passage 44 extending axially of the shaft 20, and the tubular member 70 is open at its inner end so that the cooling fluid may flow into said member from the said passage 44. The body of each wing is provided with a passage 71 into which the cooling fluid flows from the tubular member 70. After flowing through the passage 71, the cooling fluid for each wing passes through an inwardly directed outlet tube 72 from which it passes into the chamber 52 already referred to. From the chamber 52 the cooling fluid flows through passages 53 to the outlet chambers 54 and 57', as already described. The tubes 72 have a sliding or telescopic connection with the body of the rotor so as to permit the inward or outward movement of the wings with respect to the body of the rotor during the rotation of the latter without disconnecting the fluid passage. The inner ends of the tube 72 are desirably provided with outwardly directed flanges 73 respectively, so as to cause the water to flow outwardly away from the joint between the tubes and body of the rotor and thereby prevent leakage of the cooling fluid between the tube 72 and the body of the rotor. In order to insure thorough circulation of the cooling fluid through the body of each wing and to procure effective cooling of the latter, each wing is provided with a plurality of baffles 74, 75 and 76, whereby the fluid is forced to take a circuitous path through the body of the wing.

In order to provide against the leakage of the cooling fluid between the tubular members 70 and the body of the rotor into the motor casing 1, I have provided a passage 77 surrounding each of the members 70 in the body of the rotor, each of the passages 77 leading to two of the outlet passages 53 in the rotor, as shown in Fig. 5. It is to be understood that the cooling fluid is supplied under pressure in the passage 44 in the shaft 20, so as to insure circulation of the cooling fluid, and that for this reason provision against leakage at this point is highly desirable. With the construction described, the passage 77 affords a means whereby any of the fluid leaking between member 70 and the body of the rotor can flow freely out of the rotor and thereby make its escape without passing into the combustion chamber. The flow of this leaking fluid outwardly of the rotor is facilitated by the inward pressure at the joint in question of the gases within the combustion chamber.

I shall now describe the means whereby the motor is oiled or lubricated. The lubricant is supplied under considerable pressure through a pipe or conduit 80, which communicates with an annular conduit 81 surrounding the shaft 20. From the interior of the conduit 81 extend the radial passages 82 which communicate during the rotation of the shaft 20 successively with radial passages 83 in the shaft, the passages 83 communicating with a longitudinal tube or pipe 84, extending axially of the shaft 20 and having at its inner end radial outlet portions 85 (see Figs. 2, 9 and 10) which communicate with passages 86 leading to the sliding joint between the tubular members 70 and the body of the rotor. Also extending from the inner end of the tube 84 are passages 87 which extend longitudinally through the body of the rotor on opposite sides of the wings (see Fig. 9) and communicate at their outer ends with a radial passage 88 which is provided at its outer ends with portions leading to the sliding joint between the tubes 72 and the body of the rotor. Additional passages 89 extend from the tube 74 through the rotor on opposite sides of the wings, as shown in Fig. 9, each of these passages leading to one of the recesses or pockets 7, in which the projection 6 of a wing reciprocates during the rotation of the rotor. In order to insure thorough lubrication between the body of the rotor and the wings, each of the passages 89 terminates in a groove 90, which extends outwardly along the side wall of the corresponding recess of pocket 7. The outer portion of the groove 90 communicates with a groove 91 which extends longitudinally of the slot or groove 4 in which the wing reciprocates. In order to insure the flow of the lubricant towards the ends of the grooves 91, from the intermediate portions of said grooves communicating with the grooves 90, the grooves 91 are inclined outwardly from their point of connection with grooves 90, so that the lubricant is effectively fed outwardly towards the ends of the grooves 91 by centrifugal force. In order to distribute the lubricant over a considerable area transversely of the recesses or pockets 7, the grooves 90 are, as shown, desirably inclined first to one side of said recesses or pockets and then towards the other side. It is to be understood that lubricant passage 89 and lubricant grooves 90 and 91 are provided for each of the two opposite faces of each wing. To further insure lubrication between the wings and the body of the rotor, the wings may be provided in opposite faces with grooves 92 which communicate with the grooves 90 when the wings are in their outermost positions and serve to convey lubricant inwardly during the inward movement of the wings.

By forcing oil through the above passages, a very effective lubrication is maintained between the wings and the body of the rotor. The lubrication between the rotor and the interior of the motor casing 1 is effected by means of lubricant which flows into the cylinder from the rotor. Referring to Fig. 7, it will be seen that the outer ends of the wings of the rotor are curved so as to provide a small groove 93 between the outer ends of the wings and the inner wall of the casing 1. This groove tends to gather up lubricant during the rotation of the rotor, the lubricant being conveyed around the inner wall of the said casing by the rotor so as to maintain a suitable lubrication between the rotor and the said casing. In order to prevent all of the lubricant from flowing out of the casing 1, the outer wall of the outlet opening 21 (see Fig. 3) is arranged slightly inwardly of the cylindrical inner wall of the casing 1. The latter wall is shown in dot and dash lines at 95 in Fig. 3.

A motor constructed in accordance with my invention has numerous advantages. It may be, and desirably should be, run at a very high speed and is for this reason especially suitable for driving the propellers of flying machines. A suitable speed for the motor would be 3,000 revolutions per minute, and much greater speeds may be obtained. By reason of the high speed of operation, looseness or inaccuracy of fit of the rotor with respect of the motor casing is not seriously objectionable in operation, inasmuch as there is not sufficient time for an objectionable escape of the fuel or products of combustion through ordinary leaky places such as may occur. Furthermore the motor, if made of the usual metals such as iron or steel, is of very light weight for a given horsepower, a feature which is not only an advantage of itself but also because of the much smaller cost of producing a light motor than a heavy motor.

While I have shown one embodiment of my invention it is to be understood that I am not limited to this embodiment and that many changes and modifications may be made in the structure and operation described without departing from the spirit of my invention.

I claim—

1. The combination of a casing having a fuel inlet and an outlet or exhaust, a rotor mounted therein and having wings rotatable with said rotor and engaging the inner walls of said casing, said wings being movable toward and away from the axis of rotation of said rotor, whereby continuous engagement may be maintained between them and the inner walls of said casing during the rotation of said rotor, means whereby the supply of fuel passing through said inlet is intermittently prevented during a predetermined extent of rotation of said rotor, and means for effecting the ignition of the fuel in said casing to cause the rotation of said rotor, said rotor being provided with means whereby a cooling medium may be passed through said wings.

2. An internal combustion motor having a casing, and a rotor therein, said rotor comprising a body and a wing movable relatively to the body, said rotor being provided with means for circulating a cooling medium through the wing without discharging the same into the interior of the casing.

3. The combination of a casing having a fuel inlet and an outlet or exhaust, a rotor mounted therein and having wings rotatable with said rotor and engaging the inner walls of said casing, said wings being movable toward and away from the axis of rotation of said rotor, whereby continuous engagement may be maintained between them and the inner walls of said casing during the rotation of said rotor, said rotor being provided with means whereby a cooling medium may be passed through said wings.

4. The combination of a casing and a rotor therein, said rotor comprising a body portion and a wing rotatable therewith and engaging the inner walls of said casing, said wing being movable toward and away from the axis of rotation of said rotor whereby continuous engagement may be maintained between it and the inner walls of said casing during the rotation of said rotor, said rotor being provided with means whereby a fluid medium may be passed through the body and wing thereof for controlling the temperature thereof.

5. The combination of a casing and a rotor therein, said rotor comprising a body portion and a wing rotatable therewith and engaging the inner walls of said casing, said wing being movable toward and away from the axis of rotation of said rotor whereby continuous engagement may be maintained between it and the inner walls of said casing during the rotation of said rotor, said rotor being provided with means whereby a fluid may be passed through the body thereof in proximity to substantially the entire periphery thereof and also through said wing to control the temperature of said rotor.

6. The combination of a casing and a rotor within said casing comprising a body and a wing movable relatively to said body and engaging said casing, said rotor being provided with a fluid conduit or passage extending through said body and wing, and with means whereby fluid leaking between said body and said wing may be discharged from said rotor without passing into the chamber between the rotor and the inner wall of said casing.

7. The combination of a casing, and a rotor within said casing comprising a body and a wing movable relatively to said body and engaging said casing, said rotor being provided with a fluid conduit or passage extending through said body and wing, and with means whereby fluid leaking between said body and said wing may be permitted to flow freely under a low pressure from said rotor without passing into the chamber between the rotor and the said casing.

8. The combination of a casing, a rotor within said casing comprising a body and a wing movable relatively to said body and engaging the interior of said casing, said rotor being provided with a fluid passage extending through said body and wing, and with means whereby fluid leaking between said body and said wing may be discharged and permitted to flow freely into said passage without passing into the chamber between the rotor and the said casing.

9. A motor having a rotor comprising a body and a wing movable relatively to said body, said rotor being provided with a fluid passage extending through said body and wing and having a telescopic connection between the body and wing through which said passage extends.

10. A motor having a rotor comprising a body and a wing movable relatively to said body, said rotor being provided with a fluid passage extending from said body into said wing, through the latter and back again into said body and having a connection between the body and wing through which said passage extends.

11. A motor having a rotor comprising a body and a wing movable relatively to said body, said rotor being provided with a fluid conduit or passage extending through said body and wing and back again into said body, and having a telescopic connection between the body and wing through which said passage extends, and having means for causing fluid leaking between the co-acting parts of said telescopic connection to be discharged into said passage.

12. The combination of a casing, a rotor mounted therein and having a body and a wing engaging the inner walls of said casing, said wing being movable toward and away from the axis of rotation of said rotor, whereby continuous engagement may be maintained between it and the inner walls of said casing during the rotation of said rotor, and said casing and wing being provided with means whereby a cooling medium may be passed therethrough.

13. The combination of a casing, a rotor mounted therein and having a body and a wing engaging the inner walls of said casing, said wing being movable toward and away from the axis of rotation of said rotor, whereby continuous engagement may be maintained between it and the inner walls of said casing during the rotation of said rotor, said casing being provided with means whereby a cooling medium may be passed in a considerable number of streams throughout a major portion of the body thereof and also through the ends thereof, and said rotor being provided with means whereby a cooling medium may be passed through the body and also the wing thereof.

14. A motor having a rotor comprising a body and a wing movable relatively to said body, said rotor being provided with a passage for a cooling medium extending from said body into said wing and having a sliding connection between the body and wing through which said passage extends to permit relative movement between the body and wing without the escape of the cooling medium, and means for automatically lubricating said connection.

15. A motor having a rotor comprising a body provided with a groove, a wing movable in said groove relatively to said body, said rotor being provided with a passage for cooling fluid extending from said body into said wing and having a telescopic connection between said body and wing through which said passage extends to permit relative movement between said body and wing without the escape of cooling fluid, and means for supplying lubricant to said connection and also throughout substantially the entire length of the contacting walls of the groove and wing.

16. The combination of a horizontal casing, a rotor therein having a shaft, and means for supplying lubricant to said rotor through said shaft, the casing having an outlet port spaced inwardly from the peripheral inner wall of the casing whereby a certain amount of lubricant is retained in the casing.

17. The combination of a casing, having a power chamber, a rotor mounted therein, means comprising a rotary valve operated from said rotor to control the admission of fuel to said chamber, ignition means comprising an igniting device arranged outside of said chamber, the casing having a passage whereby communication may be established between said chamber and the space surrounding said igniting device, and valve means connected to and movable with said valve about the same axis to control the opening or closing of said passage.

18. The combination of a casing having a power chamber, a rotor mounted therein, a member providing a valve operated from said rotor to control the admission of fuel to said chamber, and ignition means comprising an igniting device arranged outside of said chamber, the casing having a passage whereby communication may be established between said chamber and the space surrounding said igniting device, said member being also provided with valve means movable with said valve to control the opening or closing of said passage, said casing having a continuously open exhaust opening, the passage of the products of combustion to said opening being controlled by said rotor.

19. The combination of a casing having a power chamber, a rotor mounted eccentrically therein, said rotor having a body portion and wings rotatable therewith and engaging the inner walls of said casing, said wings being movable toward and away from the axis of rotation of said rotor whereby continuous engagement may be maintained between them and the inner walls of said casing during the rotation of said rotor, means whereby fuel may be supplied to said chamber and whereby the supply of fuel may be intermittently cut off after a predetermined extent of rotation of said rotor, ignition means arranged outside of said chamber, and means whereby said ignition means is rendered operative or inoperative to cause the ignition of the fuel in said chamber, said body portion, wings and said casing being provided with means whereby a cooling medium may be passed through each of them.

In testimony whereof, I have signed my name to this specification.

PETER COOPER HEWITT.